(12) United States Patent
O'Banion et al.

(10) Patent No.: US 7,478,987 B2
(45) Date of Patent: Jan. 20, 2009

(54) METHOD AND APPARATUS FOR FASTENING STEEL FRAMING USING HELICAL FEATURES

(75) Inventors: Michael L O'Banion, Westminster, MD (US); Scott Rudolph, Cockeysville, MD (US); Richard C Nickels, Jr., Hampstead, MD (US); Robert A Berry, Mt. Airy, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/488,541

(22) Filed: Jul. 18, 2006

(65) Prior Publication Data

US 2006/0254189 A1 Nov. 16, 2006

Related U.S. Application Data

(62) Division of application No. 10/177,360, filed on Jun. 21, 2002, now Pat. No. 7,077,613.

(60) Provisional application No. 60/299,948, filed on Jun. 21, 2001, provisional application No. 60/299,930, filed on Jun. 21, 2001.

(51) Int. Cl.
*F16B 25/00* (2006.01)
*F16B 35/04* (2006.01)

(52) U.S. Cl. .................. 411/413; 411/415; 411/386; 411/307

(58) Field of Classification Search .......... 411/450, 411/446, 456, 451.2, 508–510, 447, 455, 411/457, 451.4, 411, 412–415, 307, 386
See application file for complete search history.

(56) References Cited

U.S. PATENT DOCUMENTS

| 1,444,618 | A | | 2/1923 | Levingston |
| 1,912,222 | A | | 5/1933 | Heyman |
| 2,006,813 | A | | 7/1935 | Norwood |
| 2,178,187 | A | | 10/1939 | Sake |
| 2,327,556 | A | | 8/1943 | Purinton |
| 2,410,047 | A | | 10/1946 | Burrows et al. |
| 2,429,239 | A | | 10/1947 | Rogers |
| 2,944,262 | A | | 7/1960 | Richman et al. |
| 2,994,243 | A | | 8/1961 | Langstroth |
| 3,121,366 | A | | 2/1964 | Panzer |
| 3,322,017 | A | | 5/1967 | Dufficy |
| 3,332,311 | A | | 7/1967 | Schultz |
| 3,517,717 | A | * | 6/1970 | Orlomoski .................. 411/311 |
| 3,524,378 | A | * | 8/1970 | Wieber .................... 411/387.3 |
| 3,682,507 | A | * | 8/1972 | Waud ........................ 411/413 |

(Continued)

FOREIGN PATENT DOCUMENTS

DE 155 135 C 10/1904

(Continued)

*Primary Examiner*—Richard E Chilcot, Jr.
*Assistant Examiner*—Chi Q Nguyen
(74) *Attorney, Agent, or Firm*—Harness, Dickey & Pierce, P.L.C.

(57) ABSTRACT

A pin with threads that extend along a portion of a stem of the pin interact with framing members as the pin pierces and is axially driven through the framing members. The interaction of the threads with the framing members cause the pin to rotate as the threads pass through the framing members and fastens the framing members together.

8 Claims, 13 Drawing Sheets

U.S. PATENT DOCUMENTS

| | | | |
|---|---|---|---|
| 3,722,280 A | | 3/1973 | Van Greuingen |
| 3,827,331 A | * | 8/1974 | Muenchinger ............ 411/387.4 |
| 3,861,269 A | * | 1/1975 | Laverty ...................... 411/413 |
| 3,877,280 A | | 4/1975 | Cornell |
| 3,882,755 A | | 5/1975 | Enstrom |
| 3,894,570 A | * | 7/1975 | Reynolds .................... 411/333 |
| 3,925,875 A | | 12/1975 | Doke |
| 4,025,029 A | | 5/1977 | Kotas et al. |
| 4,179,976 A | * | 12/1979 | Sygnator .................... 411/413 |
| 4,183,239 A | | 1/1980 | Stubbings |
| 4,218,953 A | | 8/1980 | Haytayan |
| 4,402,641 A | | 9/1983 | Arff |
| 4,511,296 A | | 4/1985 | Stol |
| 4,601,625 A | * | 7/1986 | Ernst et al. ............... 411/387.4 |
| 4,621,963 A | * | 11/1986 | Reinwall .................... 411/369 |
| 4,708,552 A | | 11/1987 | Bustos et al. |
| 4,787,795 A | | 11/1988 | Kraus |
| 4,810,150 A | | 3/1989 | Matsukane et al. |
| 4,840,523 A | | 6/1989 | Oshida |
| 4,844,676 A | * | 7/1989 | Adamek ..................... 411/386 |
| 4,902,182 A | | 2/1990 | Lewis |
| 5,030,051 A | | 7/1991 | Kaneko et al. |
| 5,207,750 A | | 5/1993 | Rapata |
| 5,240,361 A | | 8/1993 | Armstrong et al. |
| 5,253,965 A | | 10/1993 | Angel |
| 5,259,689 A | | 11/1993 | Arand et al. |
| 5,294,227 A | * | 3/1994 | Forster et al. ............... 411/386 |
| 5,323,632 A | | 6/1994 | Shirasaka et al. |
| 5,333,483 A | | 8/1994 | Smith |
| 5,375,957 A | | 12/1994 | Golledge |
| 5,376,097 A | | 12/1994 | Phillips |
| 5,567,101 A | | 10/1996 | Martin |
| 5,658,110 A | | 8/1997 | Kraus |
| 5,718,142 A | | 2/1998 | Ferraro |
| 5,775,860 A | | 7/1998 | Meyer |
| 5,829,817 A | | 11/1998 | Ge |
| 5,855,099 A | | 1/1999 | Hoffman |
| 5,863,167 A | * | 1/1999 | Kaneko ...................... 411/426 |
| 6,000,892 A | * | 12/1999 | Takasaki ..................... 411/413 |
| 6,023,898 A | | 2/2000 | Josey |
| 6,045,312 A | * | 4/2000 | Hsing ......................... 411/412 |
| 6,273,656 B1 | | 8/2001 | Cleland et al. |
| 6,276,644 B1 | | 8/2001 | Jennings et al. |
| 6,354,683 B1 | | 3/2002 | Benbow |
| 6,471,140 B2 | | 10/2002 | Barry et al. |
| 6,616,391 B1 | * | 9/2003 | Druschel .................. 411/387.2 |
| 6,705,147 B2 | | 3/2004 | Judge |
| 6,719,512 B2 | | 4/2004 | O'Banion et al. |
| 6,805,525 B2 | | 10/2004 | Oswald |
| 6,862,864 B2 | | 3/2005 | O'Banion et al. |
| 6,905,299 B2 | | 6/2005 | Moores |
| 6,966,737 B2 | * | 11/2005 | McGovern et al. .......... 411/413 |
| 7,008,157 B2 | | 3/2006 | O'Banion et al. |
| 7,077,613 B2 | * | 7/2006 | Rudolph et al. ............. 411/447 |
| 7,255,523 B2 | * | 8/2007 | Laan .......................... 411/411 |
| 7,326,014 B2 | * | 2/2008 | Levey et al. ................. 411/308 |
| 2002/0071741 A1 | | 6/2002 | Oswald |
| 2003/0012619 A1 | | 1/2003 | O'Banion et al. |

FOREIGN PATENT DOCUMENTS

| | | |
|---|---|---|
| DE | 308 681 C | 10/1918 |
| DE | 369 395 C | 2/1923 |
| DE | 2557845 A1 | 6/1977 |
| DE | 31 47 430 A | 6/1983 |
| DE | 199 34 998 A | 2/2001 |
| FR | 2 595 609 | 9/1987 |
| FR | 2 651 283 | 8/1989 |
| FR | 2 745 863 | 3/1996 |
| GB | 608 373 A | 9/1948 |
| JP | 59 185529 A | 10/1984 |
| WO | WO 92 03664 A | 3/1992 |
| WO | WO 01 38746 A | 5/2001 |
| WO | WO 01 65125 A | 9/2001 |
| WO | WO 03/001075 | 1/2003 |

* cited by examiner

US 7,478,987 B2

METHOD AND APPARATUS FOR FASTENING STEEL FRAMING USING HELICAL FEATURES

CROSS-REFERENCE TO RELATED APPLICATIONS

This application is a divisional of U.S. patent application Ser. No. 10/177,360, filed on Jun. 21, 2002 now issued U.S. Pat. No. 7,077,613 which claims the benefit of U.S. Provisional Application Nos. 60/299,948, filed Jun. 21, 2001, and 60/299,930 filed Jun. 21, 2001. The disclosures of the above applications are incorporated herein by reference.

FIELD OF THE INVENTION

The present invention relates generally to steel framing and, more particularly, to an improved cost-effective method for fastening steel framing.

BACKGROUND OF THE INVENTION

Steel framing is revolutionizing the construction industry. Steel is a high quality framing material that will not shrink, warp, or attract termites and other wood boring insects. In recent years, the price of steel has become more competitive with wood and other construction materials. However, despite its advantages, steel framing has not become prevalent in the residential construction industry. The lack of a quick and cost effective technique for fastening steel framing members has prevented steel framing from emerging as the predominant building material in residential construction.

Therefore, it is desirable to provide a quick and cost-effective technique for fastening steel framing members. It is envisioned that the steel fastening technique will be comparable in speed to an air nailer used to fasten wood materials. It is further envisioned that the steel fastening technique will provide a minimal gap between steel members, a pullout force of at least 216 lb., a shear force of at least 164 lb., as well as cause minimal destruction of any galvanize coating on the steel members.

SUMMARY OF THE INVENTION

The present invention discloses various fasteners and techniques that can be used to fasten two or more framing members together and provide the required strengths and properties discussed above.

In a first aspect in accordance with the present invention, a pin with threads is disclosed. The pin has threads that extend along a portion of a stem of the pin and interact with the framing members as the pin is driven through the framing members. The interaction of the threads with the framing members cause the pin to rotate as the threads pass through the adjacent framing members and fastens the framing members together.

In a second aspect in accordance with the present invention, a pin having curved wings is disclosed. The pin has wings that extend along a portion of a stem. The wings interact with the framing members as the pin is driven through the framing members. The interaction of the wings with the framing members cause the pin to rotate as the wings pass through the adjacent framing members and fastens the framing members together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
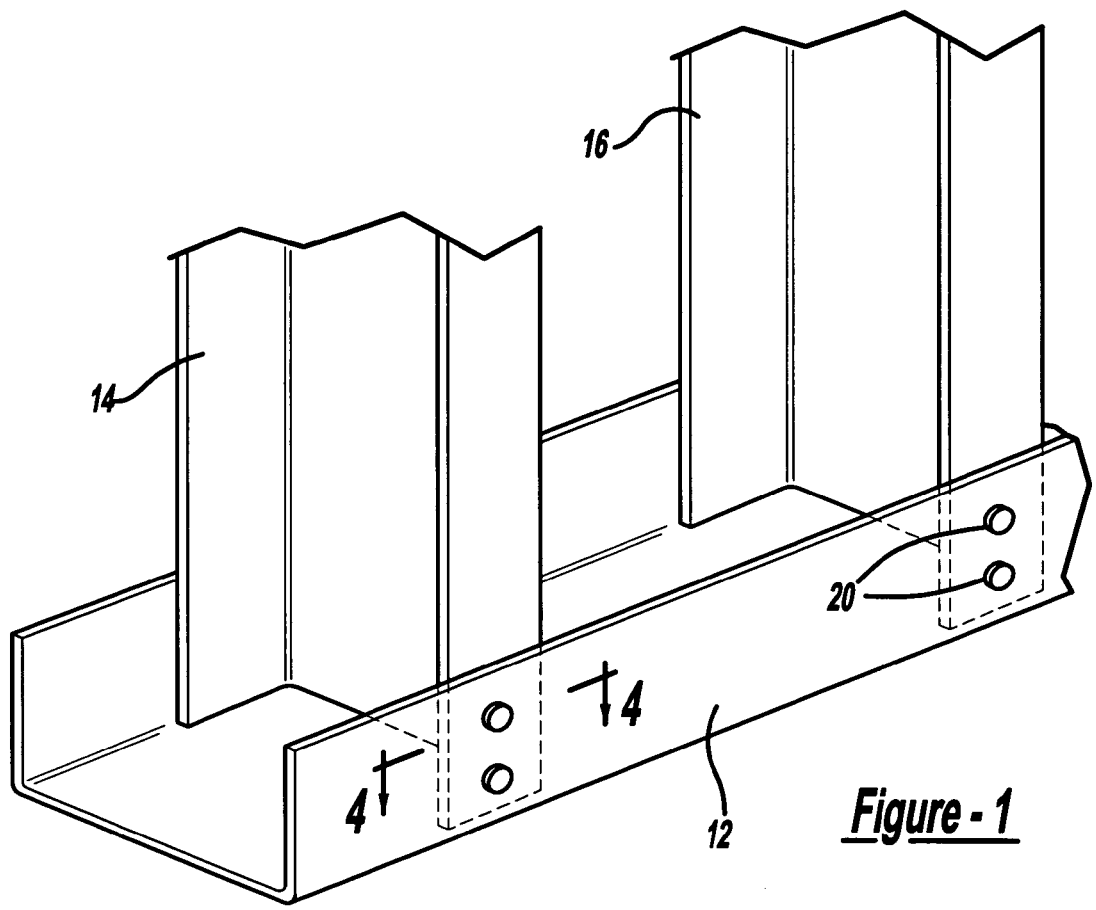
FIG. 1 is a fragmentary perspective view of a steel framing member having two additional steel framing members fastened thereto by a pin with threads in accordance with the present invention.
Figure 6:
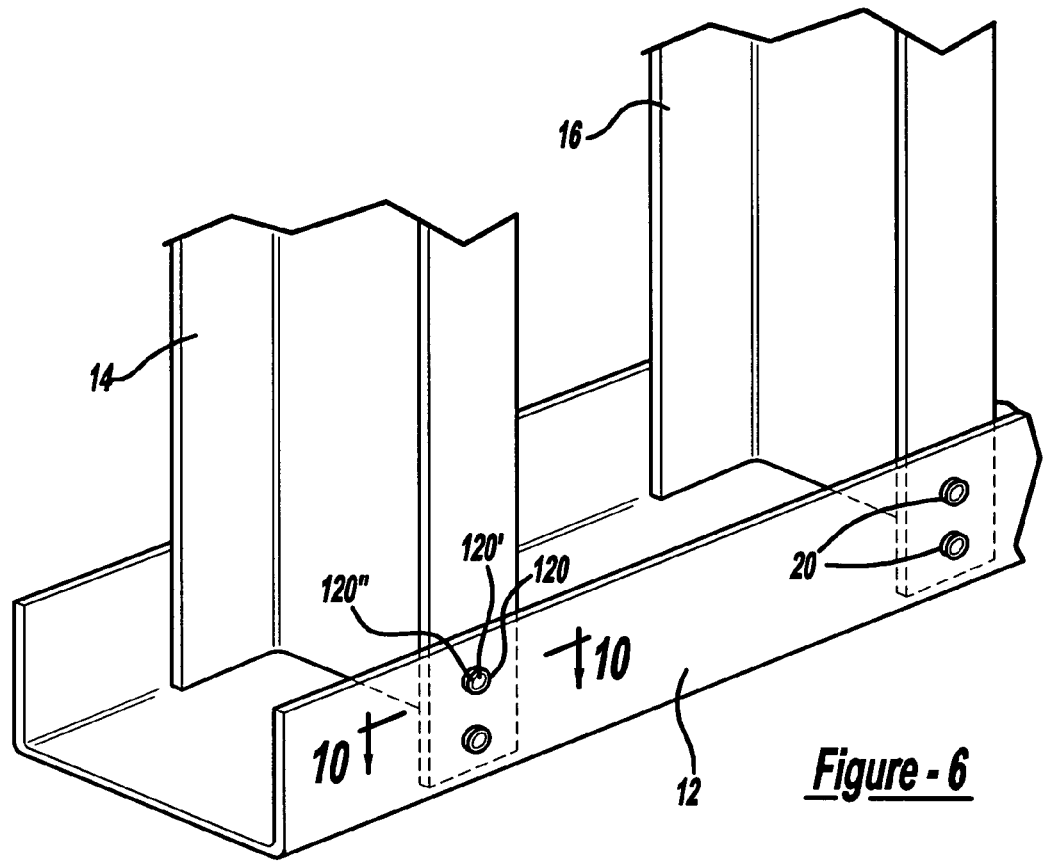
FIG. 6 is a fragmentary perspective view of a steel framing member having two additional steel framing members fastened thereto by a pin with wings in accordance with the present invention.
Figure 7:
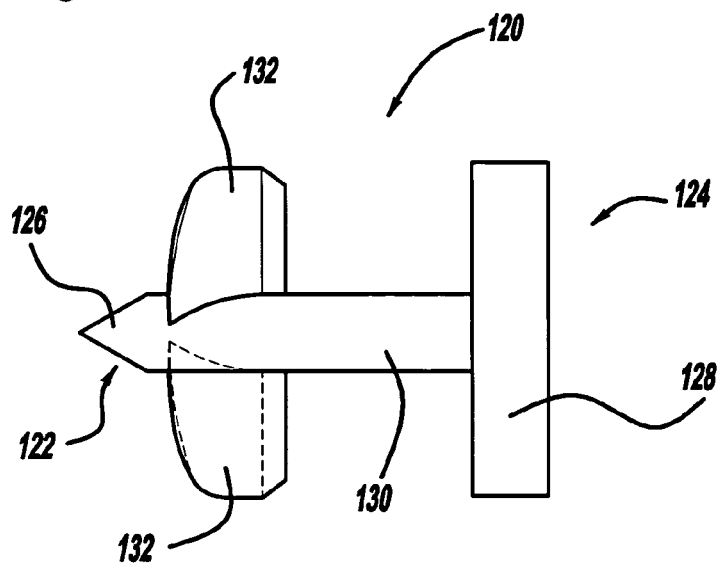
FIG. 7 is a side view of a first preferred embodiment of a pin with wings in accordance with the present invention.
Figure 8:
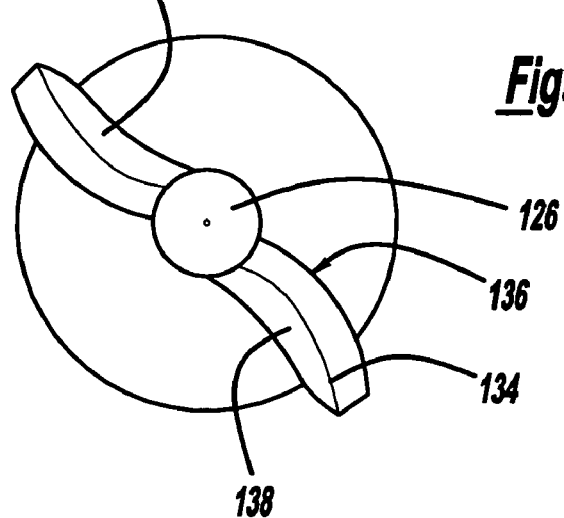
FIG. 8 is a bottom view of the first preferred embodiment of the pin with wings in accordance with the present invention.
Figure 9:
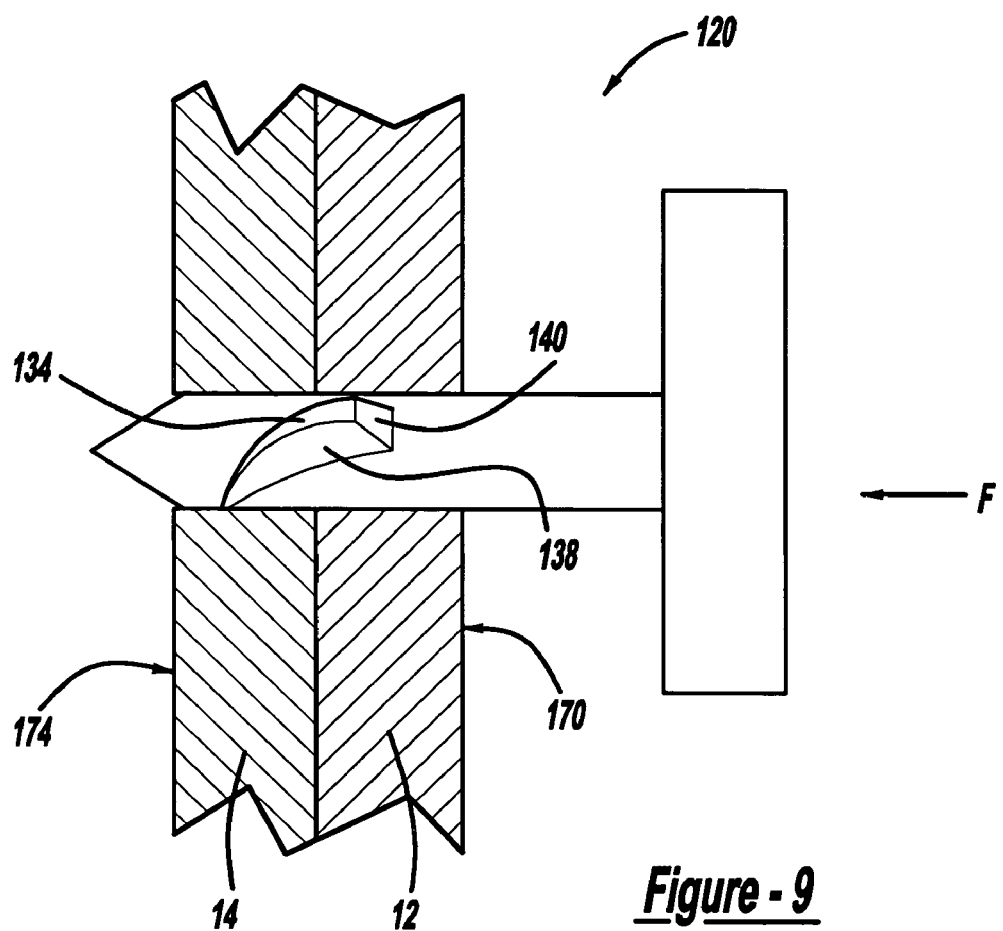
FIG. 9 is cross-sectional view, taken along line 10-10 of FIG. 6, illustrating the first preferred embodiment of the pin with wings partially piercing through two steel members.
Figure 10:
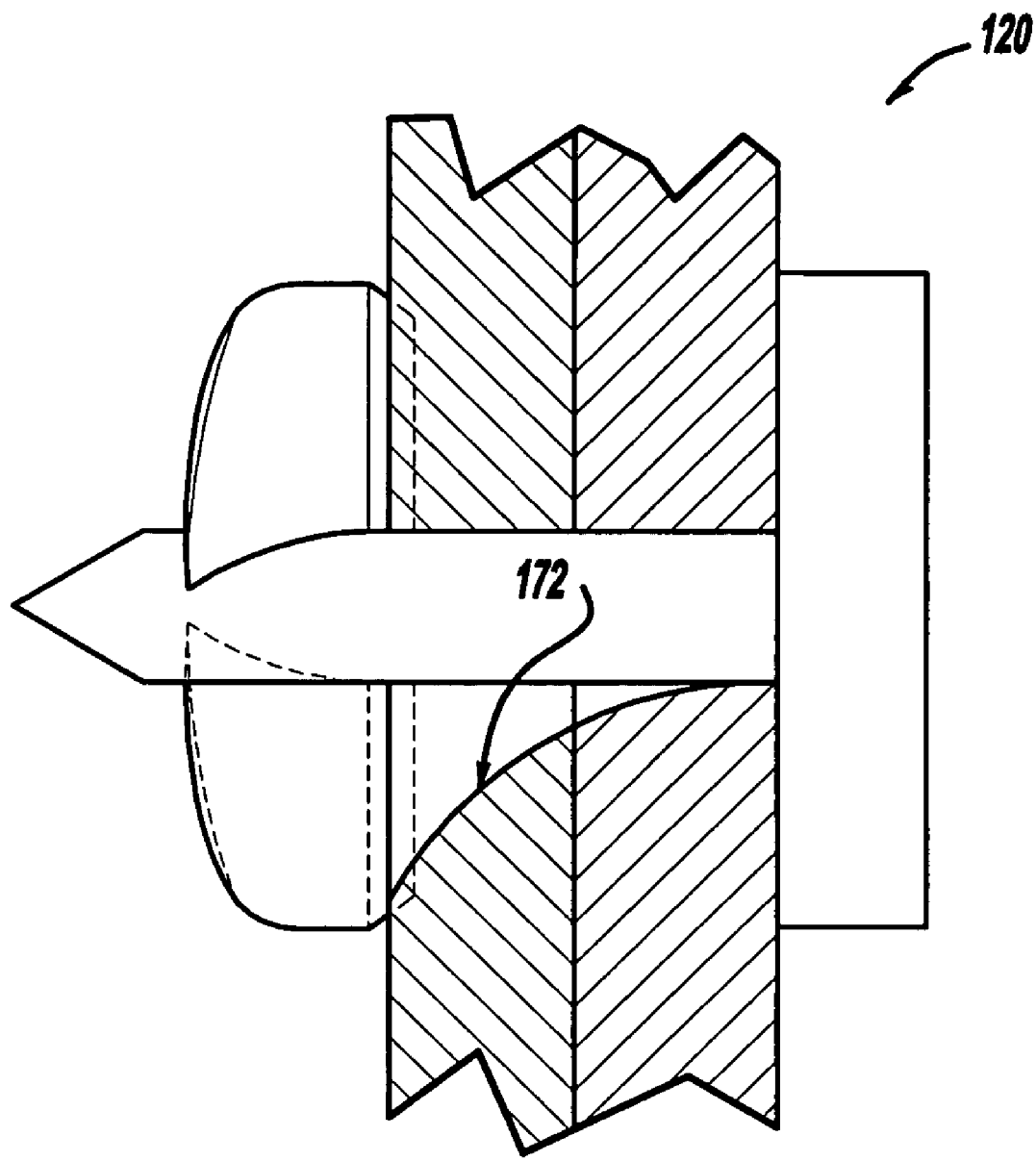
FIG. 10 is a cross-sectional view, taken along line 10-10 of FIG. 1, illustrating wings of the first preferred embodiment of the pin engaging the underside of one of the steel members in accordance with the present invention.
Figure 11:
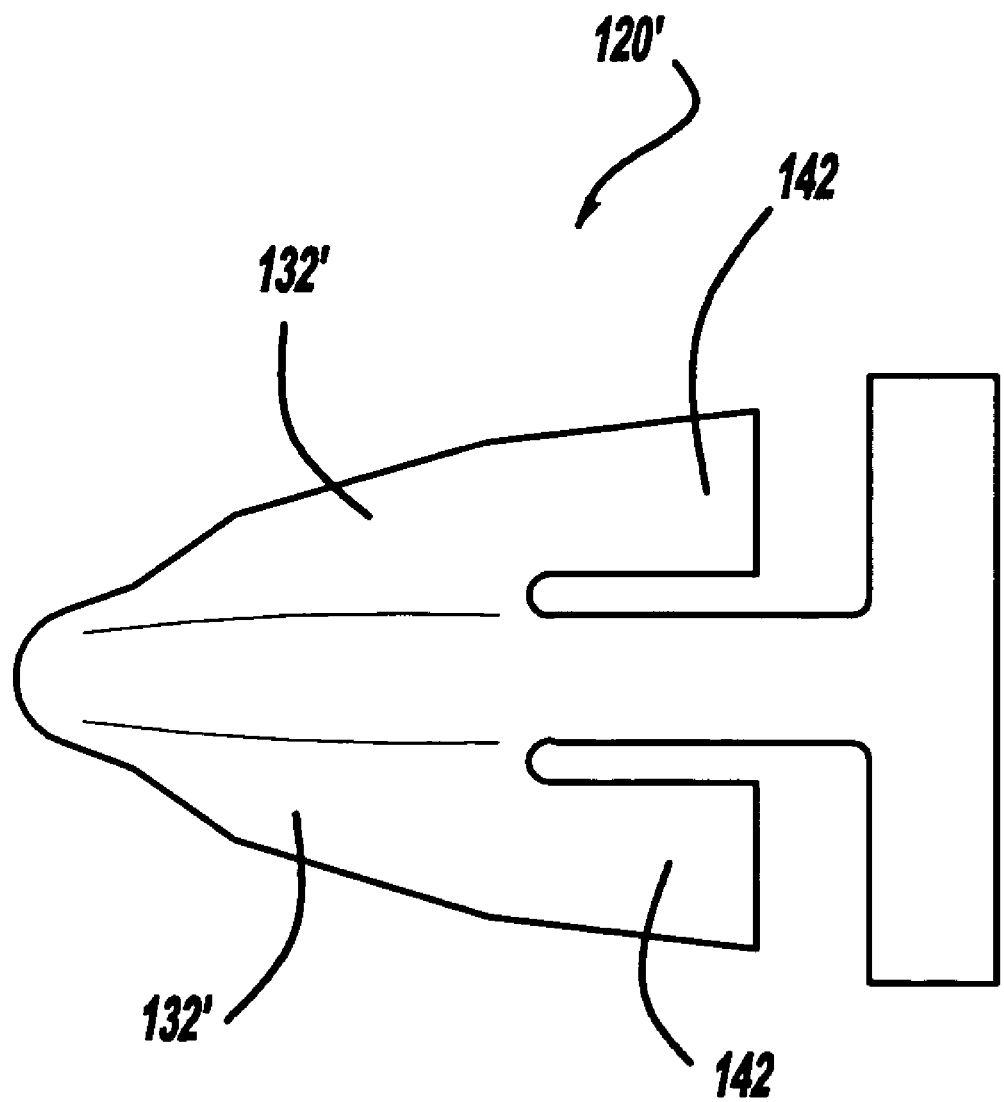
FIG. 11 is a side view of a second preferred embodiment of a pin with wings in accordance with the present invention.
Figure 12:
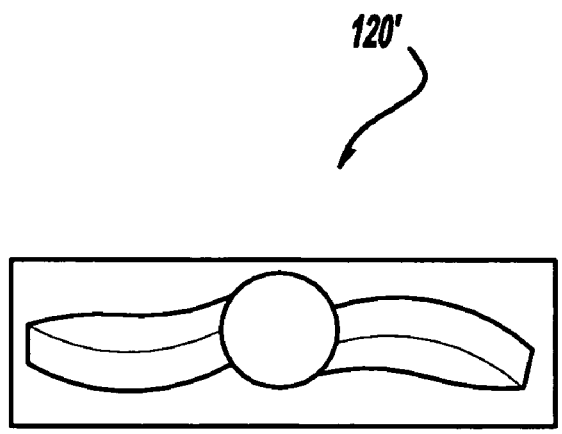
FIG. 12 is a bottom view of the second preferred embodiment of the pin with wings in accordance with the present invention.

Referring to FIGS. 1 and 6, a fragmentary perspective view of a longitudinal steel framing member 12 having two upright steel framing members 14 and 16 fastened thereto is shown. Each C-shaped framing member includes a bottom wall and two side walls having a thickness in the range from 0.018" to 0.071". Additionally, each steel framing member may range from 33 ksi to 80 ksi as is well known in the art, ksi defined as is conventionally known in the art as thousands of pounds per square inch. As will be more fully described below, one or more fasteners 20 may be used to join the upright steel framing members 14 and 16 to the longitudinal steel framing member 12. While the following description is provided with reference to this particular configuration, it is readily understood that the fastening technique of the present invention is applicable to any two or more adjacent members made of steel or other material having similar attributes to those of steel.

In accordance with a first aspect of the present invention, one or more pins 20 are used to join framing members. An exemplary pin 20 is depicted in FIGS. 2-5. Pin 20 has axially opposite first and second ends 22 and 24. First end 22 has a tip 26 that is configured to pierce framing members upon application of a force F to pin 20. Second end 24 has a head 28 that is configured to receive force F to cause pin 20 to fasten adjacent framing members together, as will be described in more detail below. A stem 30 extends between tip 26 and head 28. A set of threads 32 extend along a portion of stem 30 between tip 26 and head 28. Threads 32 interact with framing members 12 and 14 as pin 20 is penetrating therethrough and causes pin 20 to rotate as a result of application of driving force F to pin 20, as will be described in more detail below.

Stem 30 has a cylindrical section 34 proximate head 28 and a tapering or conical section 36 proximate tip 26. A first portion 38 of threads 32 extend along conical section 36 of stem 30. A second portion 40 of threads 32 extends along a portion of cylindrical section 34 of stem 30 proximate first portion 38. A third portion 42 of threads 32 extends along a portion of cylindrical section 34 between second portion 40 and head 28. First, second and third portions 38, 40 and 42 of threads 32 extend along stem 30 such that a majority of stem 30 has threads 32 thereon.

Figure 2:
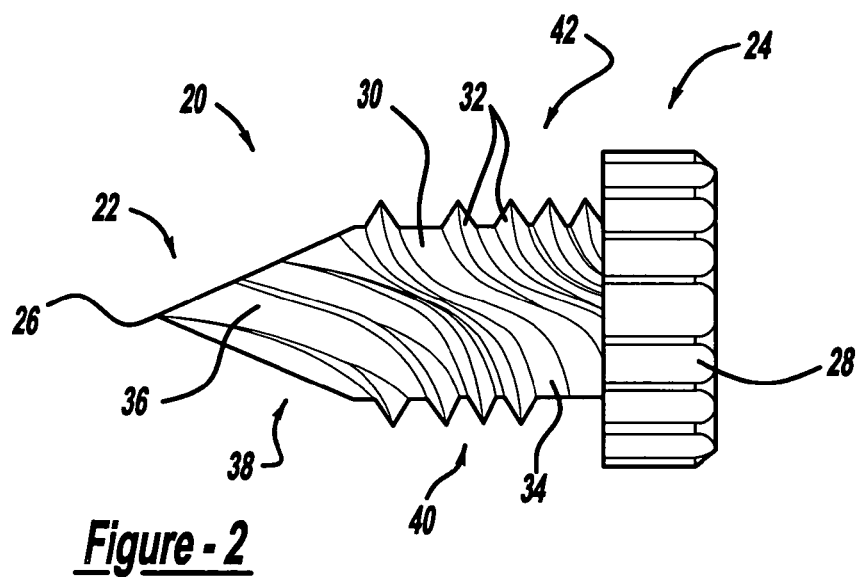
FIG. 2 is a side view of the pin with threads in accordance with the present invention.
Figure 3:
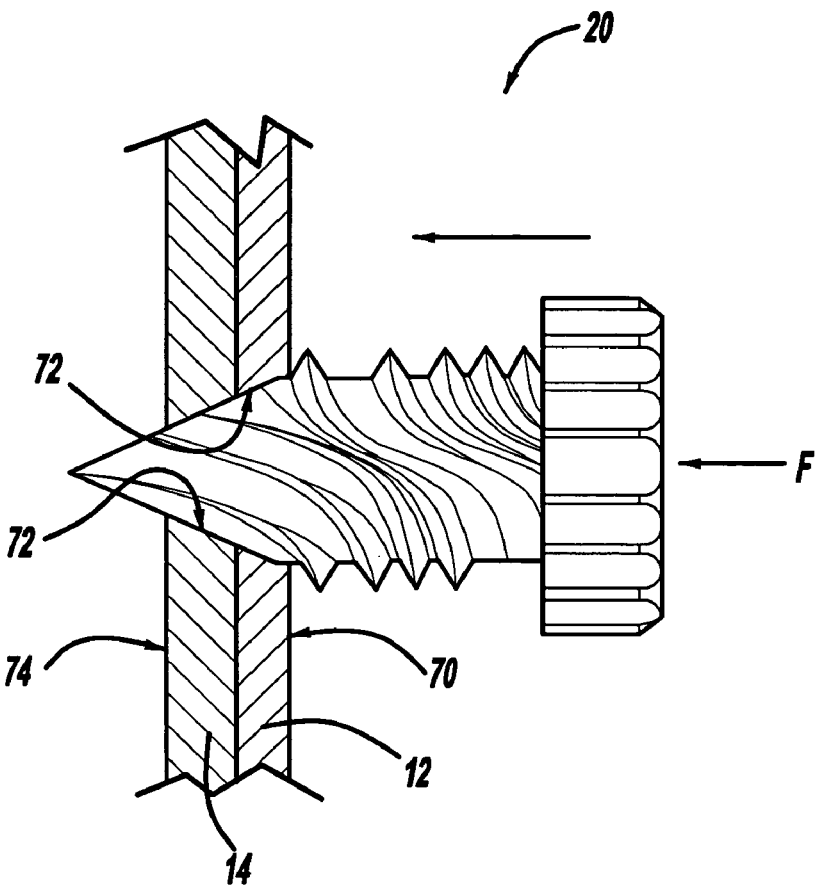
FIG. 3 is a cross-sectional view, taken along line 4-4 of FIG. 1, illustrating the pin with threads partially driven through two steel members.
Figure 4:
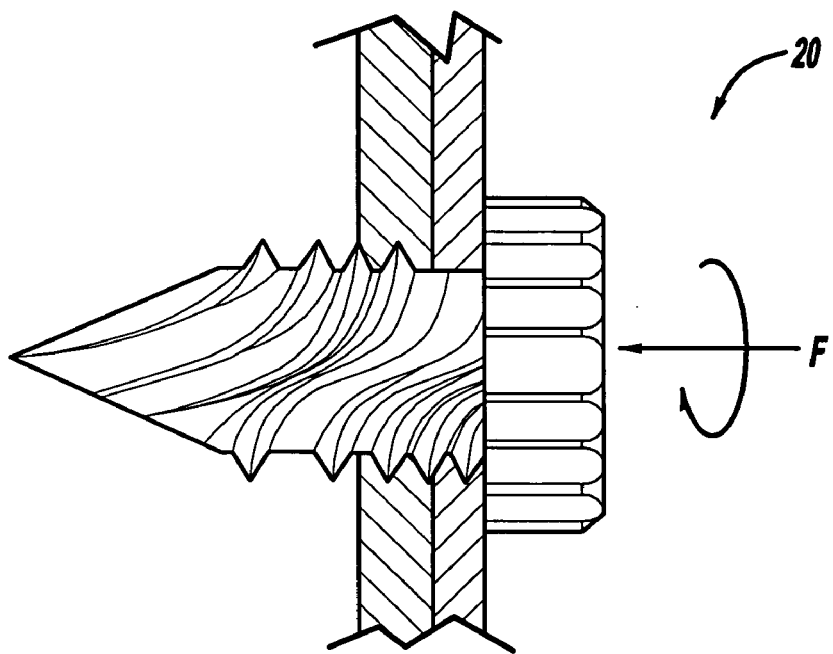
FIG. 4 is a cross-sectional view, taken along line 4-4 of FIG. 1, illustrating the pin with threads driven into the steel members in accordance with the present invention.
Figure 5:
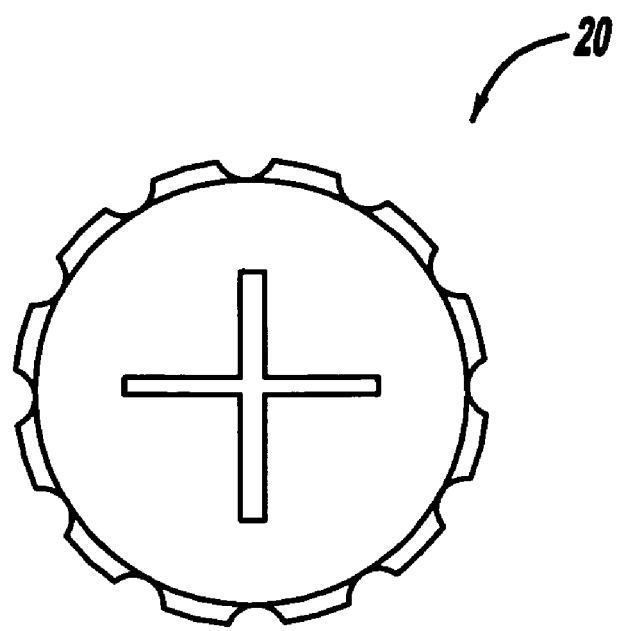
FIG. 5 is a top view of the pin with threads in accordance with the present invention.

The helix angle of threads 32 can vary along stem 30. That is, as can be seen in FIG. 2, first portion 38 of threads 32 can have a first helix angle while second portion 40 of threads 32 have a second helix angle that is different from the first helix angle. Additionally, third portion 42 of threads 32 can have a third helix angle that is different from the first and second helix angles of the respective first and second portions 38 and 40. Variation of the helix angle of threads 32 as threads 32 extend along stem 30 changes the rate at which pin 20 rotates in response to receiving driving force F. The helix angle of the threads 32 can vary not only between the different portions 38, 40 and 42 but also within portions 38, 40 and 42. Furthermore, threads 32 can have a helix angle that constantly varies as threads 32 extend along stem 30. In addition to controlling the rate of rotation of pin 20, the helix angle of threads 32 also effects the fastening of framing members together. That is, the helix angle can be arranged so that continued penetration of pin 20 through framing members 12 and 14 due to application of driving force F requires differing magnitudes of force F. Some helix angles will be conducive to easily causing pin 20 to penetrate through the framing members while other helix angles will require a larger driving force to continue penetrating through the framing members. Preferably, threads 32 or at least a portion of threads 32 are helical.

In operation, pin 20 can be used to fasten two or more adjacent framing members, such as 12 and 14 together. Pin 20 is positioned adjacent top surface 70 of framing member 12. Driving force F is applied to head 28 which causes pin 20 to move axially toward framing members 12 and 14. Axial movement of pin 20 toward framing members 12 and 14 causes tip 28 and stem 30 to pierce and penetrate through framing members 12 and 14. As pin 20 penetrates framing members 12 and 14, inner surfaces 72 of framing members 12 and 14 engage or interact with threads 32. The interaction between threads 32 and inner surfaces 72 cause pin 20 to rotate in response to continued application of driving force F and further penetration through framing members 12 and 14. The interaction between threads 32 and inner surfaces 72 also serve to secure framing members 12 and 14 between threads 32 and head 28. Driving force F is continued to be applied to head 28 until head 28 contacts top surface 70 of framing member 12. At that time, driving force F ceases to be applied to pin 20. Threads 32 along with engaging with inner surfaces 72 also engage with bottom surface 74 of framing member 14. The threads thereby fasten framing members 12 and 14 together between head 28 and threads 32 in a manner that meets the above-stated requirements.

In accordance with a second aspect of the present invention, one or more pins with wings are used to join framing members together. An exemplary pin 120 is depicted in FIGS. 7-10. Pin 120 has axially opposite first and second ends 122 and 124. First end 122 has a tip 126 that is configured to pierce framing members upon application of driving force F. Second end 124 has a head 128 that is configured to receive driving force F to cause pin 120 to penetrate through and fasten adjacent framing members together, as will be described in more detail below. A stem 130 extends axially between tip 126 and head 128. Two wings 132 extend along a portion of stem 130 proximate tip 126. Wings 132 interact the framing members as pin 120 penetrates therethrough and causes pin 120 to twist or rotate and the framing members to deform due to the curved shape of wings 132.

Wings 132 have a leading edge 134 that is configured to pierce the framing members as pin 120 is driven therethrough. Wings 132 have an engaging surface 136 that engages with inner surfaces 172 of framing members 12 and 14 as pin 120 penetrates therethrough. Opposite engaging surface 136 is a following surface 138. Wings 132 curve as they extend along stem 130 from tip 126 toward head 128. Wings 132 also curve as wings 132 extend outwardly from stem 130. The curved shape of wings 132 causes pin 120 to rotate as pin 120 is driven through framing members 12 and 14, as will be described in more detail below. Preferably, wings 132 are helical in shape. Wings 132 have a trailing edge 140 that engages with bottom surface 174 of framing member 14 after pin 120 has penetrated therethrough to fasten the framing members together.

In use, pin 120 is positioned adjacent two or more adjacent framing members, such as 12 and 14. Driving force F is applied to head 128 of pin 120 and causes tip 126 to pierce top surface 70 of framing member 12 and stem 130 to penetrate through framing members 12 and 14. As pin 120 penetrates through framing member 12 and 14, leading edge 134 pierces framing members 12 and 14. As wings 132 pass through framing members 12 and 14, engaging surfaces 136 press against inner surfaces 72 of framing members 12 and 14 and cause pin 120 to rotate. Pin 120 continues to rotate as it is driven through framing members 12 and 14 due to the interaction between wings 132 and framing members 12 and 14. The interaction between wings 132 and inner surfaces 72 also causes framing members 12 and 14 to deform. As wings 132 pass out of framing member 14, trailing edge 140 will engage bottom surface 174 of framing member 14. Engagement between trailing edge 140 and bottom surface 174 inhibits removal of pin 120 and secures framing members 12 and 14 between trailing edge 140 and head 128. Pin 120 thereby fastens framing members 12 and 14 together in a manner sufficient to meet the above stated requirements.

Figure 13:
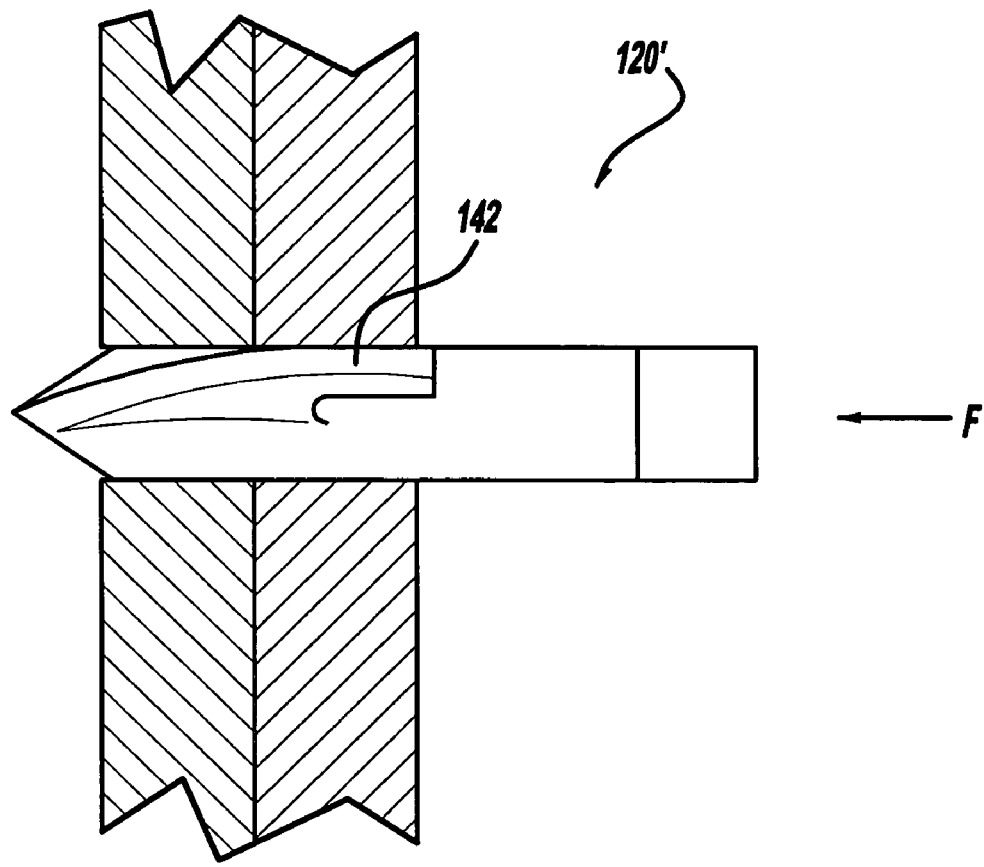
FIG. 13 is cross-sectional view, taken along line 10-10 of FIG. 1, illustrating the second preferred embodiment of the pin with wings partially piercing through two steel members.
Figure 14:
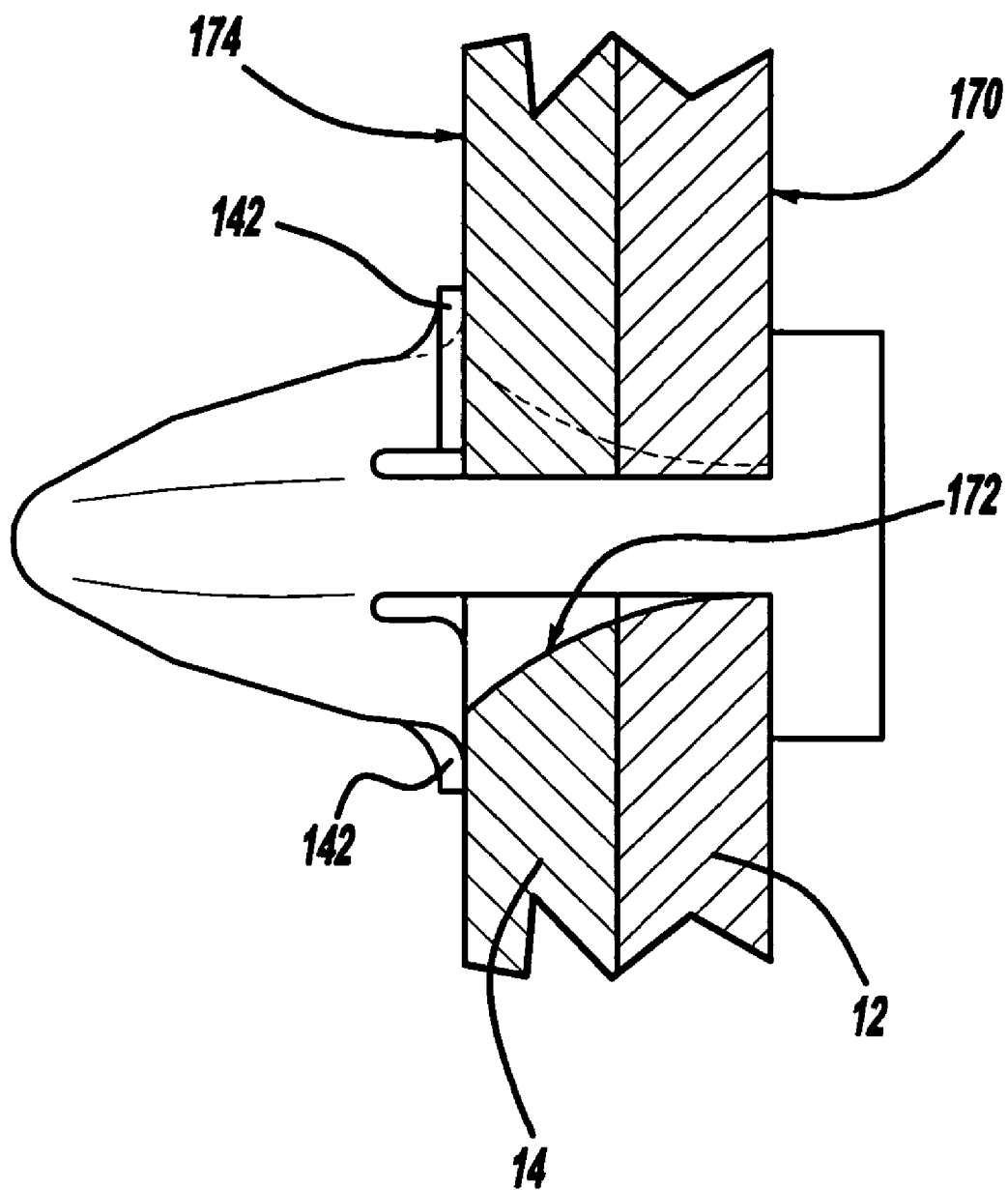
FIG. 14 is a cross-sectional view, taken along line 10-10 of FIG. 1, illustrating wings of the second preferred embodiment of the pin engaging the underside of one of the steel members in accordance with the present invention.
Figure 15:
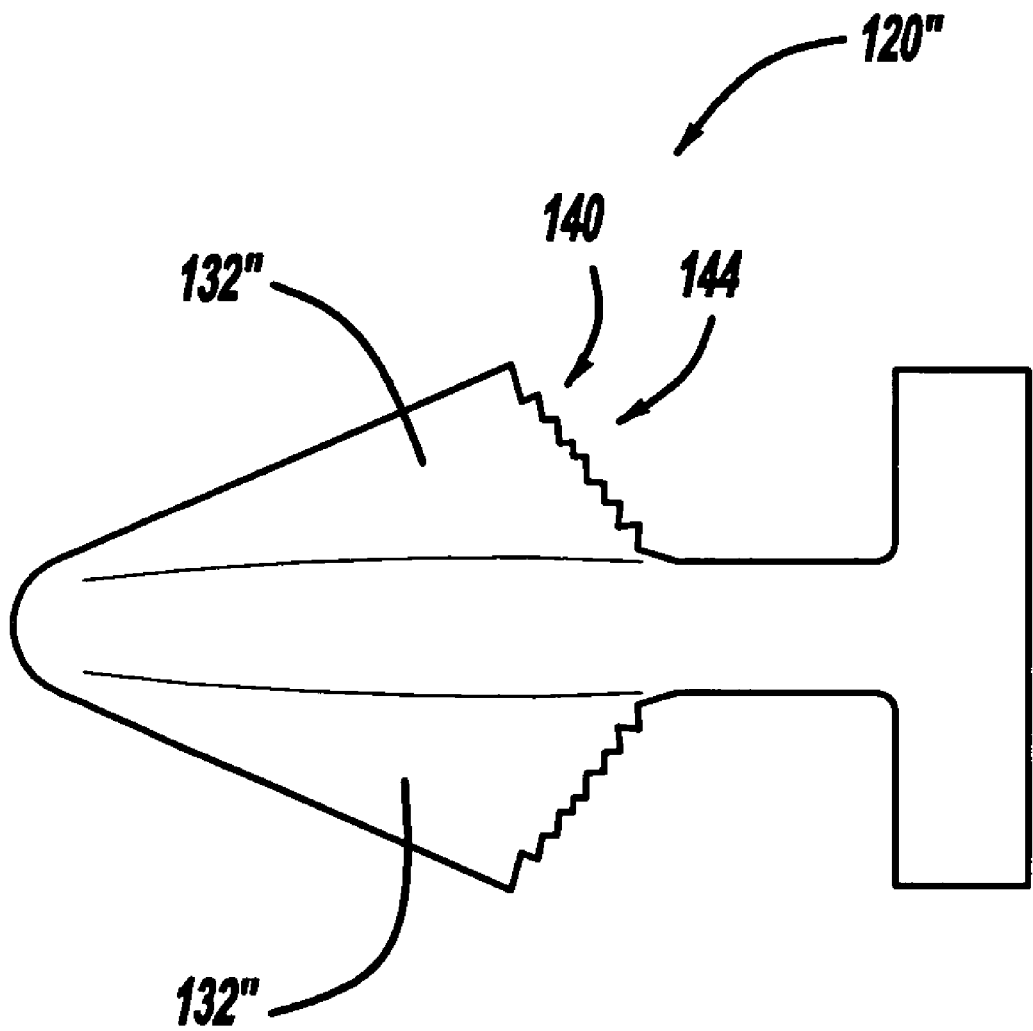
FIG. 15 is a side view of a third preferred embodiment of a pin with wings in accordance with the present invention.
Figure 16:
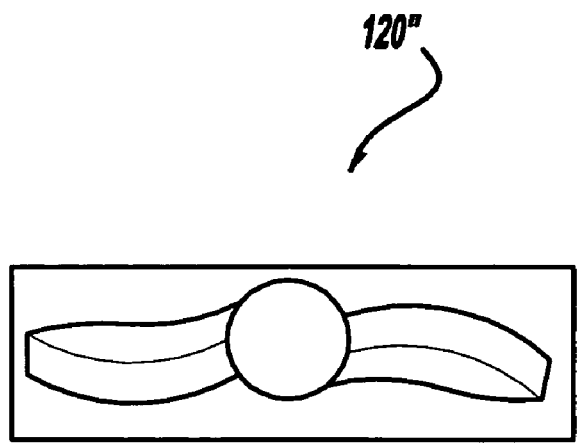
FIG. 16 is a bottom view of the third preferred embodiment of the pin with wings in accordance with the present invention.
Figure 17:
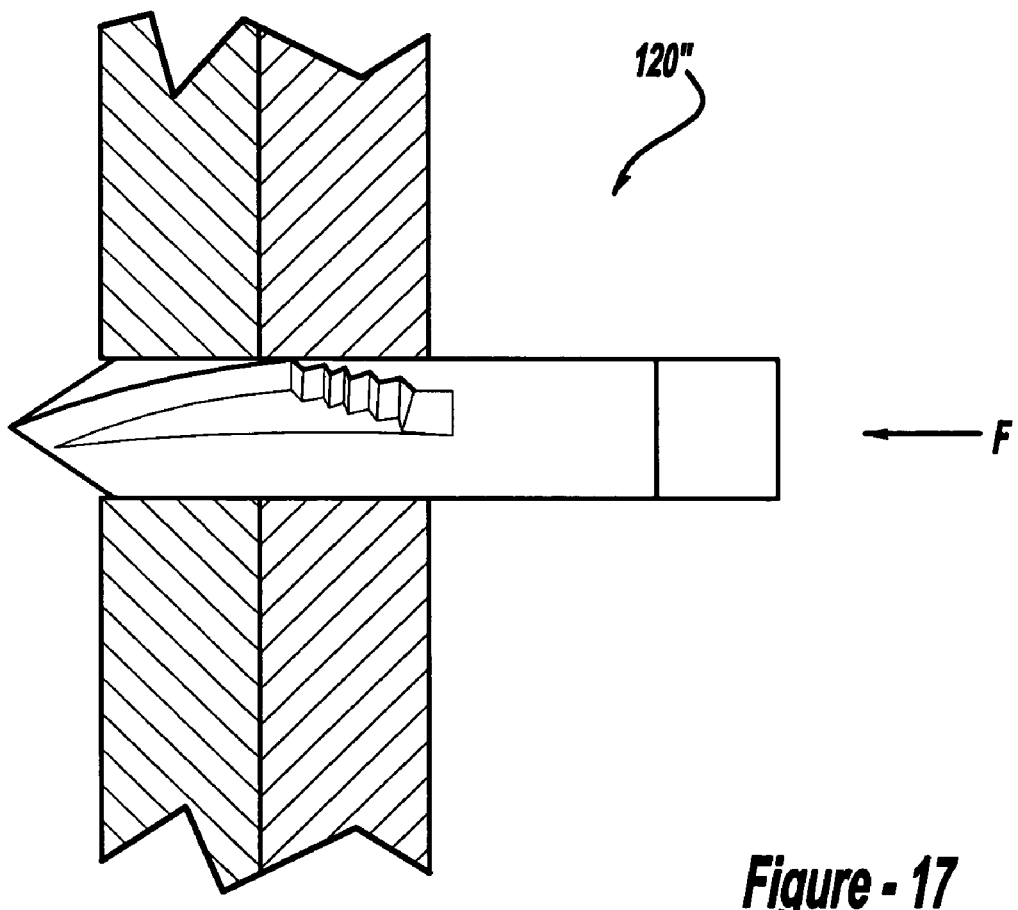
FIG. 17 is cross-sectional view, taken along line 10-10 of FIG. 1, illustrating the third preferred embodiment of the pin with wings partially piercing through two steel members.

In a second preferred embodiment, as shown in FIGS. 11-14, pin 120' has wings 132' with fingers 142 extending from trailing edge 140'. Fingers 142 are flexible or elastic in nature and compress or deform as wings 132' pass through framing members 12 and 14, as shown in FIG. 13. When wings 132' clear bottom surface 174 of framing member 14, the rotation of pin 120' caused by the curved wings 132' deform fingers 142 as they engage with bottom surface 170 of framing member 14, as shown in FIG. 14. The engagement of fingers 142 with bottom surface 74 secures framing members 12 and 14 between fingers 142 and head 128. The flexible nature of fingers 142 allows pin 120' to fasten together framing members of various thicknesses. Thus, pin 120' can be used to fasten framing members 12 and 14 together and can meet the above-stated requirements.

Figure 18:
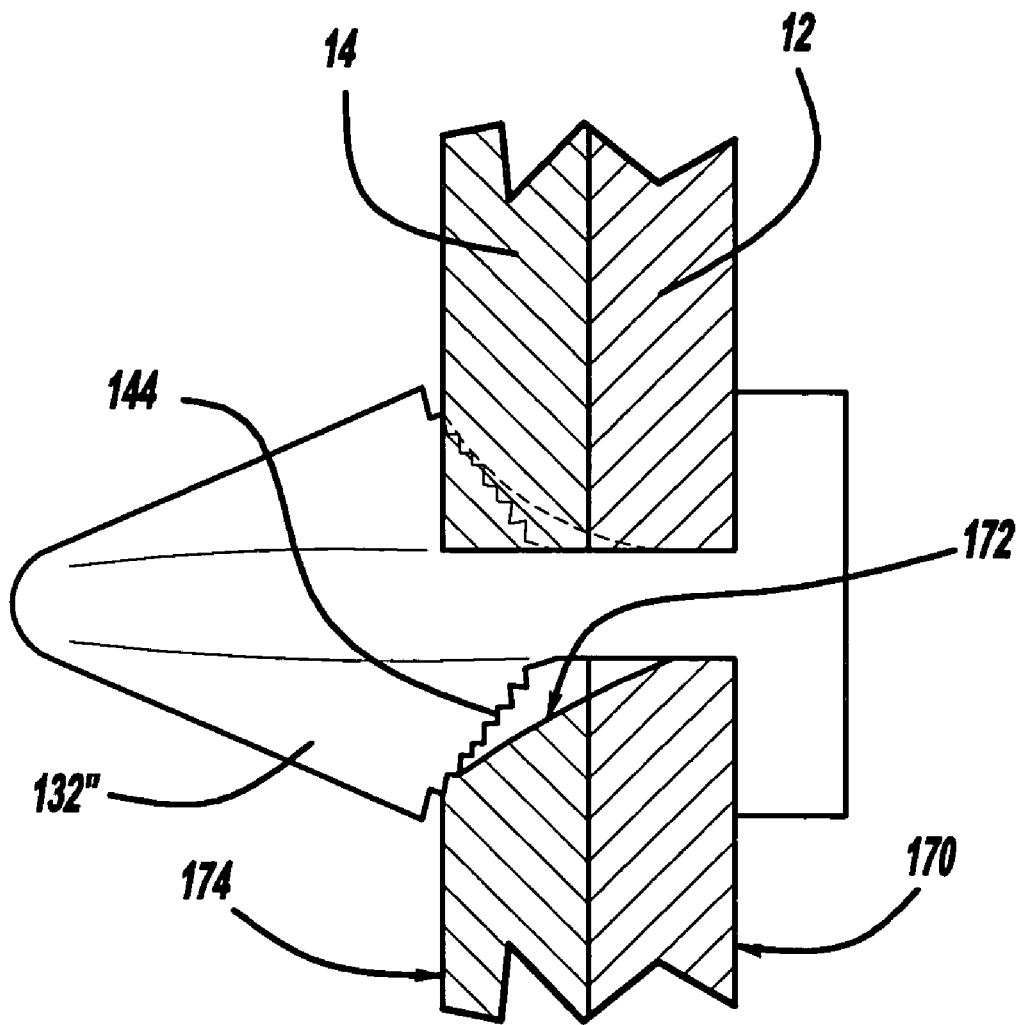
FIG. 18 is a cross-sectional view, taken along line 10-10 of FIG. 1, illustrating wings of the third preferred embodiment of the pin with wings engaging the underside of one of the steel members in accordance with the present invention.

In a third preferred embodiment, as shown in FIGS. 15-18, pin 120" has wings 132" with a trailing edge 140" that has teeth 144. Trailing edge 140" tapers as it extends toward head 128. Teeth 144 are spaced about trailing edge 140" such that teeth 144 exist at varying axial distances from head 128. The varying distances of teeth 144 allow pin 120" to fasten together framing members 12 and 14 of varying thicknesses. If desired, teeth 144 on opposite trailing edges 140" can be staggered so that each tooth 144 is at a unique axial distance from head 128. The staggering of teeth 144 enables pin 120" to fasten together framing members 12 and 14 of varying thicknesses while minimizing pull-out distance or "play" of pin 120". Pull-out distance is defined as the difference between the combined thicknesses of framing members 12 and 14 and the distance between a bottom surface of head 128 and the particular tooth that engages with bottom surface 174 of framing member 14. As shown in FIG. 18, as pin 120" penetrates through framing members 12 and 14 and trailing edge 140" passes bottom surface 174 of framing member 14, different teeth 144 engage with or pass through bottom surface 174. When head 128 is in contact with top surface 170 of framing member 12, pin 120" ceases to pass further through framing members 12 and 14 and a last tooth 148 that has passed bottom surface 174 of framing member 14 will engage with bottom surface 174 and inhibit removal of pin 120". Thus, pin 120" can be used to fasten framing members 12 and 14 together and can meet the above-stated requirements.

Figure 19:
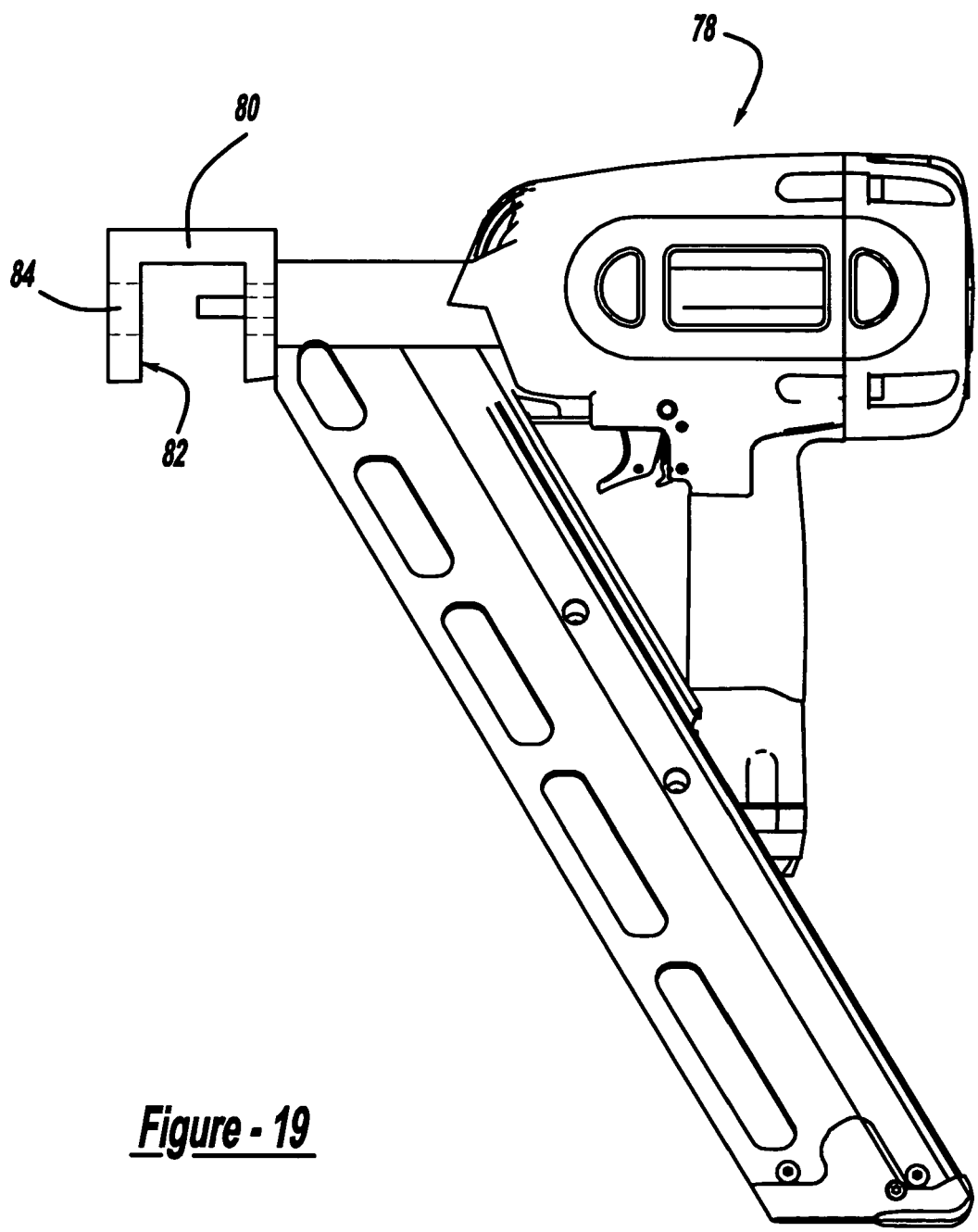
FIG. 19 is a side view of a force transmitting device that can be used to drive the pins of the present invention.

Pins 20, 120, 120' and 120" can be adapted to be driven by various force transmitting devices that are well known in the art. For example, pin 20, 120, 120', 120" can be adapted to be driven by an air nailer 78 shown in FIG. 19. When using a force transmitting device, depending upon the speed at which the device can drive pin 20, 120, 120', 120", a support for bottom surface 74 of framing member 14 may be needed. Preferably, the force transmitting device used is a rapid force transmitting device that can drive pin 20, 120, 120', 120" in excess of about 45 feet per second. When pin 20, 120, 120', 120" is driven in excess of about 45 feet per second, bottom surface 74 will not need to be supported. However, if the force transmitting device used drives pin 20, 120, 120', 120" at or below about 40 feet per second, bottom surface 74 may require support. To provide support, as shown in FIG. 19, air nailer 60 can be provided with a C-shaped frame 80 having a backing surface 82. Backing surface 82 is positioned adjacent bottom surface 74 of framing member 14 to support framing members 12 and 14 during penetration of pin 20, 120, 120', 120" through framing members 12 and 14. An opening 84 is provided in backing surface 82 to allow pin 20, 120, 120', 120" to pass through backing surface 82 without obstructing the penetration of pin 20, 120, 120', 120". It should be understood that other means or methods of supporting bottom surface 74 of framing member 14 can be employed in conjunction with device 48 without departing from the scope of the present invention.

Pin 20, 120, 120', 120" can be made from a variety of materials. Preferably, pin 20, 120, 120', 120" is made from hardened steel. However, other materials, such as galvanized coated steel, titanium or other strong material having similar characteristics to hardened steel that enable pin 20, 120, 120', 120" to operate as described to fasten framing members 12 and 14 together can be utilized without departing from the scope of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A pin for fastening framing members together comprising:
    a first end configured to pierce framing members;
    a second end configured to receive a driving force;
    a stem extending between said first and second ends; and
    a set of threads extending along a portion of said stem, said threads operable to cause said stem to rotate when penetrating through framing members in response to said driving force being applied to said second end and said threads interacting with said framing members, rotation of said stem causing said threads to fasten said framing members together, wherein a first portion of said threads has a first helix angle, a second portion of said threads has a second helix angle, said second helix angle is different from said first helix angle, and said threads extend continuously from said first portion to said second portion, and at least one of said first and second helix angles varies as an associated one of said first and second portions of said threads extends along said stem.

2. The pin of claim 1, wherein a third portion of said threads has a third helix angle and said third helix angle is different than said first and second helix angles.

3. The pin of claim 1, wherein said second end is configured to be driven by an axial force transmitting device.

4. The pin of claim 1, wherein said first end is a tapering point.

5. The pin of claim 1, wherein a first portion of said stem is cylindrical and a second portion of said stem tapers.

6. A pin for fastening framing members together comprising:
    a first end configured to pierce framing members;
    a second end configured to receive a driving force;
    a stem extending between said first and second ends; and
    a set of threads extending along a portion of said stem, said threads operable to cause said stem to rotate when penetrating through framing members in response to said driving force being applied to said second end and said threads interacting with said framing members, rotation of said stem causing said threads to fasten said framing members together, wherein a first portion of said threads has a first helix angle, a second portion of said threads has a second helix angle, and said second helix angle is different from said first helix angle, wherein at least a portion of said threads has a helix angle that varies as said portion. of said threads extends along said stem.

7. The pin of claim 6, wherein an entire portion of said threads has a helix angle that continuously varies as said threads extend along said stem.

8. A pin for fastening metal framing members together, the pin comprising:
 a first end configured to pierce adjacent metal framing members each having a strength of at least about 33 ksi;
 a second end configured to receive an axial driving force sufficient to allow said first end to pierce said framing members;
 a stem extending between said first and second ends; and
 a set of helically extending threads along a portion of said stem, said threads including at least two portions extending continuously and having differing helix angles and operable to cause said stem to rotate at two different rates when passing through framing members in response to said axial driving force being applied to said second end and said threads interacting with said framing members, rotation of said stem causing said threads to fasten said framing members together, wherein a first portion of said threads having a first helix angle extends along said stem adjacent said first end, a second portion of said threads having a second helix angle extends alone said stem adjacent said second end, a third portion of said threads having a third helix angle extends along said stem between said first and second portions, and said first helix angle causes a rotation rate that is less than a rotation rate caused by said second and third helix angles.

* * * * *

UNITED STATES PATENT AND TRADEMARK OFFICE
CERTIFICATE OF CORRECTION

PATENT NO. : 7,478,987 B2  Page 1 of 1
APPLICATION NO. : 11/488541
DATED : January 20, 2009
INVENTOR(S) : Michael L. O'Banion It is certified that error appears in the above-identified patent and that said Letters Patent is hereby corrected as shown below:

Title Page,
Item (75) Inventors, delete "Scott Rudolph, Cockeysville, MD (US); Richard C Nickels, Jr., Hampstead, MD (US); Robert A Berry, Mt. Airy, MD (US)"

Column 8,
Line 12, "alone" should be -- along --.

Signed and Sealed this

First Day of June, 2010

David J. Kappos
*Director of the United States Patent and Trademark Office*